Figure 1:
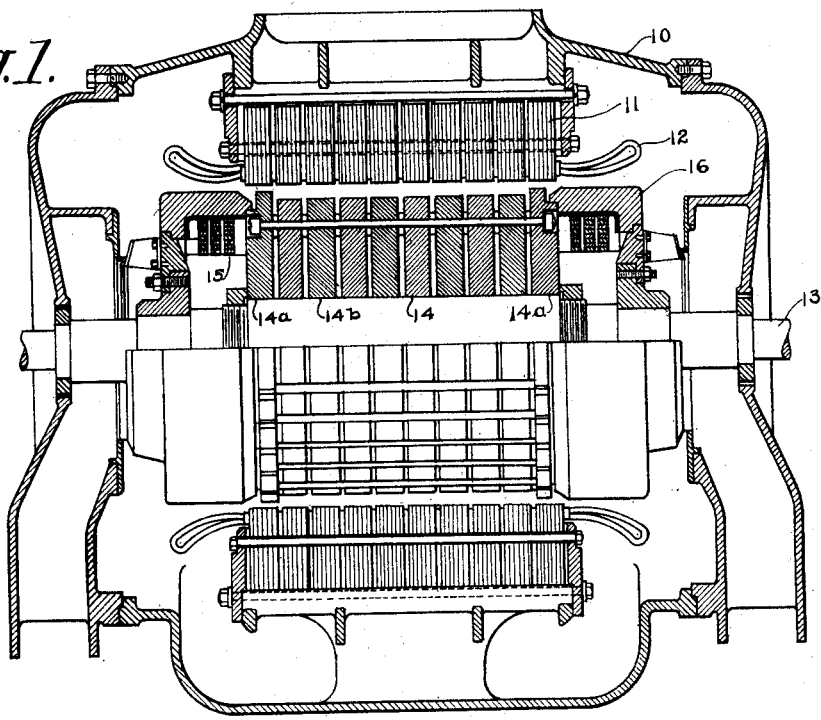

A. M. GRAY.
DYNAMO ELECTRIC MACHINE.
APPLICATION FILED APR. 3, 1909.

982,811.

Patented Jan. 31, 1911.

Witnesses
John L. Johnson.
Chas L. Byron.

Inventor
Alexander M. Gray
By Chas. E. Lord
Attorney

UNITED STATES PATENT OFFICE.

ALEXANDER M. GRAY, OF MILWAUKEE, WISCONSIN, ASSIGNOR TO ALLIS-CHALMERS COMPANY, A CORPORATION OF NEW JERSEY.

DYNAMO-ELECTRIC MACHINE.

982,811.  Specification of Letters Patent.  Patented Jan. 31, 1911.

Application filed April 3, 1909. Serial No. 487,720.

*To all whom it may concern:*

Be it known that I, ALEXANDER M. GRAY, a subject of the King of England, residing at Milwaukee, in the county of Milwaukee and State of Wisconsin, have invented certain new and useful Improvements in Dynamo-Electric Machines, of which the following is a full, clear, and exact specification.

This invention relates to dynamo-electric machines, and particularly to turbo-alternators having rotating field magnets.

In dynamo-electric machines, whether of the direct current or alternating current type, it is generally desirable that the flux passing between the field core and armature core be equally distributed along the length of the machine in the air gap and in the armature core. This equal distribution of flux is not obtained in all machines, however, chiefly on account of leakage which takes place at the ends of the machine, and particularly in those machines, such as turbo generators having rotating elements provided with supporting or retaining members, such as rings, for protecting and holding in position the end of the coils. If the flux is not equally distributed, or if the flux is much denser at the middle of the machine than at the ends, the core losses, and consequently the heat generated in the machine is greater at the center than at the ends. Inasmuch as the ends of the machine are much more easily cooled than the middle part thereof, it is quite desirable that the flux density in the air gap or in the clearance space between the armature and field magnet and in the armature core be substantially uniform from one end of the machine to the other or as great at the ends of the machine as at the middle thereof.

The present invention has for its object the provision of means for increasing the flux density at the ends of the machine, so that substantially uniform flux density will be obtained from one end of the machine to the other.

In carrying out my invention I make the air gap or clearance space between the rotating and stationary cores of the machine of less width at the ends than between the ends, in order that the reluctances of the magnetic paths near the ends of the machine will be smaller than midway between the ends, where the flux density is normally the greatest. This is preferably accomplished by making the diameter of the rotating core of the machine greater at the ends than between the ends.

The invention may be further briefly summarized as consisting in certain novel details of construction and combinations and arrangements of parts, which will be described in the specification and set forth in the appended claims.

Figure 2:
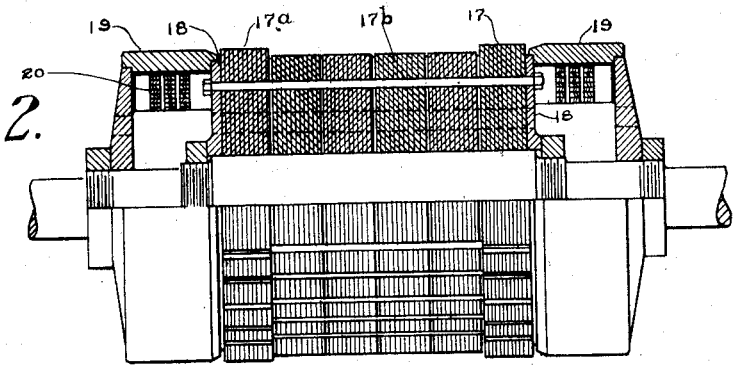

Reference is had to the accompanying sheet of drawings, wherein I have shown my invention applied to a turbo-generator having a rotating field magnet of the smooth core or cylindrical type, and having field coils, the ends of which project beyond the core of the field magnet and are inclosed by protecting end rings, and in the drawings, Figure 1 is a vertical longitudinal sectional view taken through the machine, part of the rotating field magnet being shown in elevation. Fig. 2 is a sectional elevation of a slightly modified form of rotary field member, the core of the field member in this figure being built up of sheet metal punching.

Referring now to Fig. 1 of the drawings, 10 represents the housing which incloses the machine so as to deaden the noise incident to high speeds of rotation, and to enable proper ventilation to be secured, said housing supporting the laminated core 11, which in this case is the core of the stationary armature having a winding 12. At 13 is shown the rotary shaft which projects through openings in the ends of the housing, and has mounted thereon the rotating field member, which in this case is, as stated above, of the cylindrical or smooth core type. As shown in this figure, the core 14 is built up of a number of circular disks which are assembled on the shaft side by side and spaced apart and are provided with slots, which receive a field winding consisting of coils, the ends 15 of which project beyond the core and are inclosed and retained in position against the action of centrifugal force by annular rings 16. These rings, which are usually formed from material having considerable magnetic permeability for the sake of securing rings having ample strength, engage the two outermost disks, which will be designated 14$^a$ to distinguish them from the intermediate disks which will be designated 14$^b$.

It will be seen that in this machine, as in machines of other types employing coil supporting and retaining members at the ends of the rotating element, part of the flux will leak through the rings from pole to pole, instead of passing through the air gap into the stator or stationary armature core, and unless provision is made for equalizing the flux density, the density will be greater at the middle of the machine than at the ends, and particularly greater at the middle than in the end sections of the core which are engaged by the end rings. To enhance the flux density at the ends, and particularly to secure uniform flux density from end to end of the machine, I so construct the machine that the clearance between the rotating member and stationary member is less at the ends than at a distance from or intermediate the ends. This I accomplish in the present case by making the diameter of the two outer or end disks, 14ª, greater than the diameter of the disks 14ᵇ, between the two end disks. The diameter of the outer disks may be made such that the density of flux passing across the air gap between these end disks and the corresponding portions of the surrounding stator core, will have any value within certain limits, as compared with the density at the middle of the machine, or between the disks of lesser diameter and the corresponding portions of the core. I prefer to make the diameter of the disks 14ª such, however, that the flux density will be uniform from end to end.

In Fig. 2 I have shown the core 17, built up of groups of laminæ, which in this case are spaced apart at a number of points dividing the core into sections, the two outer sections being designated 17ª, and the intermediate sections being designated 17ᵇ. To the outer sections are secured plates 18, which may be made of non-magnetic material, providing the speed of rotation and consequently the stresses due to the action of centrifugal force, are not too high, and the end rings 19, which protect and hold in position the projecting portions 20 of the field winding, engage directly these plates or disks 18.

For the same reason as described above, namely, to increase the flux density at the ends of the machine, and particularly to secure uniform distribution of flux from end to end, the laminæ of the outer sections are made of larger diameter than the laminæ of the intermediate sections 17ᵇ.

I do not desire to be confined to the exact details shown, but aim in my claims to cover all modifications which do not involve a departure from the spirit and scope of my invention.

What I claim as new is:

1. In a dynamo-electric machine, rotary and stationary cores separated by a clearance space or air gap which is of uniform width throughout the middle portion of the machine and is of less width at the ends.

2. In a dynamo-electric machine, a stator, a rotor having coils which project beyond the ends of said core, means formed of magnetic material for protecting and holding in position the projecting portions of the coils, the clearance between the stator and rotor cores being substantially equal at the two ends of the machine, and substantially uniform and of greater width throughout the middle portion of the machine.

3. In a dynamo-electric machine, a stationary armature member comprising a core and coils, a rotary field member located within the armature member and comprising a core and coils which project beyond the ends of the core, end rings of magnetic material surrounding the projecting parts of the coils of the rotary member and holding them against displacement, the clearance between the stationary and rotary cores being uniform throughout the greater part of the length of the machine but being less near the end rings.

4. In a dynamo-electric machine, rotary and stationary members, each comprising a core and a winding, the rotary member being located within the stationary member with the core of the rotary member substantially entirely in the space bounded by the planes of the ends of the core of the stationary member, the diameter of the core of the rotary member being greater at the ends than between the ends and being substantially uniform throughout the middle portion.

5. In a dynamo-electric machine, a stationary member having a core and a rotary member having a core, the end sections of the core of the rotary member being within the end sections of the core of the stationary member and the air gap between the end sections of the two cores being less than that between the remaining sections of the two cores, which latter air gap is substantially uniform throughout.

6. In a dynamo-electric machine, a stationary member comprising an armature core and coils, a rotary field member comprising a core and coils which project beyond the ends of the core, the cores of the stationary and rotary members being built up of spaced sections, and the diameter of the rotary core being substantially uniform throughout save the end sections which are of greater diameter, and end rings of magnetic material surrounding the projecting portions of the coils of the rotary member and retaining them in position.

7. In a dynamo-electric machine, a rotary member having a core consisting of a number of spaced sections, the end sections being of substantially equal diameter and the remaining sections being of less and substantially uniform diameter, and a stationary member having a core surrounding that of the rotary member and having its ends located in substantially the same planes as the ends of the core of the rotary member.

8. In a dynamo-electric machine, a rotary member having a core consisting of a number of spaced sections, the end sections of said core being of greater diameter than the remaining sections and the latter being of substantially uniform diameter, coils carried by said core and projecting beyond the ends thereof, and end rings of magnetic material for retaining the projecting portions of said coils in place, and a stator having a core surrounding the core of the rotary member and being of substantially uniform internal diameter.

9. In a dynamo-electric machine, a rotary member having a core consisting of a definite number of rigid disks, the diameter of the outer or end disks being greater than the diameter of the remaining disks and the latter being all of substantially the same diameter, and a stator having a core which surrounds the core of the rotary member and is of substantially uniform internal diameter.

10. In a dynamo-electric machine, a rotary member comprising a rotor core built of a number of rigid disks, coils which are carried by said core and have portions projecting beyond the end of the latter, and coil retaining members of magnetic material surrounding the projecting portions of the coils and engaging the two outer or end disks respectively, the diameter of the outer or end disks being greater than that of the remaining disks, which latter are all of substantially uniform diameter, in combination with a stator having a core which surrounds the core of the rotary member and is of substantially uniform internal diameter.

11. In a dynamo-electric machine, a stator, and a rotor, the clearance between the stator and rotor cores being substantially equal at the two ends of the machine and substantially uniform and of greater width throughout the middle portion of the machine.

12. In a dynamo-electric machine, a stationary armature member, and a rotary field member located within the armature member, the clearance between the stationary and rotary cores being uniform throughout the greater part of the length of the machine but being less near the ends.

13. In a dynamo-electric machine, a rotary member having a core consisting of a number of spaced sections, the end sections of said core being of greater diameter than the remaining sections and the latter being of substantially uniform diameter, and a stator having a core surrounding the core of the rotary member and being of substantially uniform internal diameter.

In testimony whereof I affix my signature, in the presence of two witnesses.

ALEXANDER M. GRAY.

Witnesses:
H. C. CASE,
CHAS. L. BYRON.